(12) United States Patent
Park et al.

(10) Patent No.: US 10,235,553 B2
(45) Date of Patent: Mar. 19, 2019

(54) DISPLAY DEVICE FOR FINGERPRINT DETECTION

(71) Applicant: BEYONDEYES, Suwon-si, Gyeonggi-do (KR)

(72) Inventors: Kwangsue Park, Seoul (KR); Dong Wook Nam, Suwon-si (KR); Byung Il Min, Suwon-si (KR)

(73) Assignee: BEYONDEYES, Gyeonggi-do (KR)

( * ) Notice: Subject to any disclaimer, the term of this patent is extended or adjusted under 35 U.S.C. 154(b) by 225 days.

(21) Appl. No.: 15/268,353

(22) Filed: Sep. 16, 2016

(65) Prior Publication Data
US 2017/0083738 A1    Mar. 23, 2017

(30) Foreign Application Priority Data

Sep. 17, 2015 (KR) .......................... 10-2015-0131891

(51) Int. Cl.
G09G 3/30    (2006.01)
G06K 9/00    (2006.01)

(52) U.S. Cl.
CPC .................................. G06K 9/0004 (2013.01)

(58) Field of Classification Search
CPC .... G09G 3/3233; G09G 3/325; G09G 3/3258; G09G 2360/14; G09G 2360/142; G09G 2360/144; G09G 2360/148; G06K 9/0004
USPC .................................. 345/76–87, 90, 92, 175
See application file for complete search history.

(56) References Cited

U.S. PATENT DOCUMENTS

2007/0296685 A1* 12/2007 Kang .................... G09G 3/3426
345/102
2008/0117192 A1* 5/2008 Liu .......................... G09G 3/20
345/204
2016/0042216 A1* 2/2016 Yang ..................... G06K 9/0002
382/124

* cited by examiner

Primary Examiner — Jennifer T Nguyen
(74) Attorney, Agent, or Firm — Knobbe Martens Olson & Bear LLP

(57) ABSTRACT

A display device for fingerprint detection is disclosed. The display device includes a plurality of gate lines and a plurality of data lines, a first switching transistor, a storage capacitor, a light-receiving element, and a second switching transistor. The plurality of data lines are used for reading a charged voltage across the storage capacitor.

7 Claims, 7 Drawing Sheets

DISPLAY DEVICE FOR FINGERPRINT DETECTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit under 35 USC 119(a) of Korean Patent Application No. 10-2015-0131891, filed with the Korean Intellectual Property Office on Sep. 17, 2015, the disclosure of which is incorporated herein by reference in its entirety.

BACKGROUND

The present invention relates to a display device, and, more particularly, to a display device for fingerprint detection.

There have been ongoing researches for implementing a fingerprint detection capability in a display device. In order to detect a fingerprint, an approach of introducing new signal lines in addition to the conventional gate lines and data lines has been introduced, but this resulted in a decreased aperture ratio. In order to address the decreased aperture ratio, the brightness of backlight could be increased, but this created a new problem of increased power consumption.

SUMMARY

In some aspects, a display device for fingerprint detection is disclosed. The display device includes a plurality of gate lines configured for applying gate signals, a plurality of data lines, intersecting with the plurality of gate lines to define a plurality of pixel regions and configured for applying data signals, a first switching transistor, located in the pixel region and configured for outputting the data signal that is applied to a first terminal to a second terminal when the gate signal is applied to a gate that is connected to an $n^{th}$ gate line of the plurality of gate lines, a storage capacitor, located in the pixel region, having one end thereof connected to the second terminal of the first switching transistor, and configured for storing a charge in response to the data signal, a light-receiving element, located in the pixel region and having a first terminal thereof connected to an $(n-1)^{th}$ gate line of the plurality of gate lines, and a second switching transistor, having a gate thereof connected to the $(n-1)^{th}$ gate line, and having a first terminal thereof connected to a second terminal of the light-receiving element, and having a second terminal thereof connected to the one end of the storage capacitor. The plurality of data lines are used for reading a charged voltage across the storage capacitor.

In some aspects, the display device may further include at least one data driver configured for providing the data signal to the plurality of data lines and a sampling circuit, connected to the plurality of data lines and configured for sampling the charged voltage across the storage capacitor.

In some aspects, the sampling circuit may include a first charged voltage sampling circuit configured for sampling the charged voltage across the storage capacitor through the plurality of data lines, a second charged voltage sampling circuit configured for sampling a voltage in response to the data signal, and a sampling setting switch, located between the data driver and the plurality of data lines and configured for connecting the plurality of data lines to the data driver or the first charged voltage sampling circuit and the second charged voltage sampling circuit.

In some aspects, the first charged voltage sampling circuit may include a first capacitor configured for maintaining a first charged voltage, and a first switch and a second switch, connected, respectively, to either end of the first capacitor. Here, the first switch is switched between the plurality of data lines and a ground. In addition, the second switch is switched between a negative input terminal of a readout circuit and the ground. Also, the first charged voltage sampling circuit inverts a polarity of the first charged voltage by the first switch and the second switch.

In some aspects, the second charged voltage sampling circuit may include a second capacitor configured for maintaining a voltage corresponding to the data signal and a third switch connected one end of the second capacitor. Here, the third switch is switched between an output terminal of the data driver and a positive input terminal of the readout circuit.

In some aspects, the first charged voltage sampling circuit may sample the charged voltage across the storage capacitor.

In some aspects, the charged voltage across the storage capacitor may be changed from a voltage that is set by the data signal in a previous frame by a current that the light-receiving element generates.

In some aspects, the storage capacitor may maintain the charged voltage until a new data signal is applied in the current frame.

In some aspects, a polarity of the data signal in the previous frame and a polarity of the data signal in the current frame may be different from each other.

In some aspects, the light-receiving element may be a diode-coupled transistor connected between the $(n-1)^{th}$ gate line and the second terminal of the second switching transistor.

In some aspects, the light-receiving element may be a floating gate transistor.

In some aspects, the second switching transistors that are connected, respectively, to the plurality of gate lines, and the light-receiving elements may operate sequentially by the gate signals that are provided by the plurality of gate lines.

In some aspects, a method of detecting a fingerprint in a display device is provided. The method may include photo-electrically converting incident light when an $(n-1)^{th}$ gate line applies a gate signal, providing a current that is generated in the photo-electric conversion to a storage capacitor that is charged by a data signal that is applied in a previous frame, when an $n^{th}$ gate line applies the gate signal, sampling a first charged voltage across the storage capacitor through a data line that applies the data signal, and sampling a second charged voltage across the storage capacitor corresponding to a data signal that is applied in a current frame.

In some aspects, the method may further include inverting the first charged voltage across the storage capacitor to output and detecting an amount of change that is caused by the incident light by subtracting the first charged voltage from the second charged voltage.

BRIEF DESCRIPTION OF DRAWINGS

Hereinafter, the present invention will be described with reference to embodiments illustrated in the accompanying drawings. To help understanding of the present invention, throughout the accompanying drawings, identical reference numerals are assigned to identical elements. The elements illustrated throughout the accompanying drawings are mere examples of embodiments illustrated for the purpose of describing the present invention and are not to be used to restrict the scope of the present invention.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Figure 1:
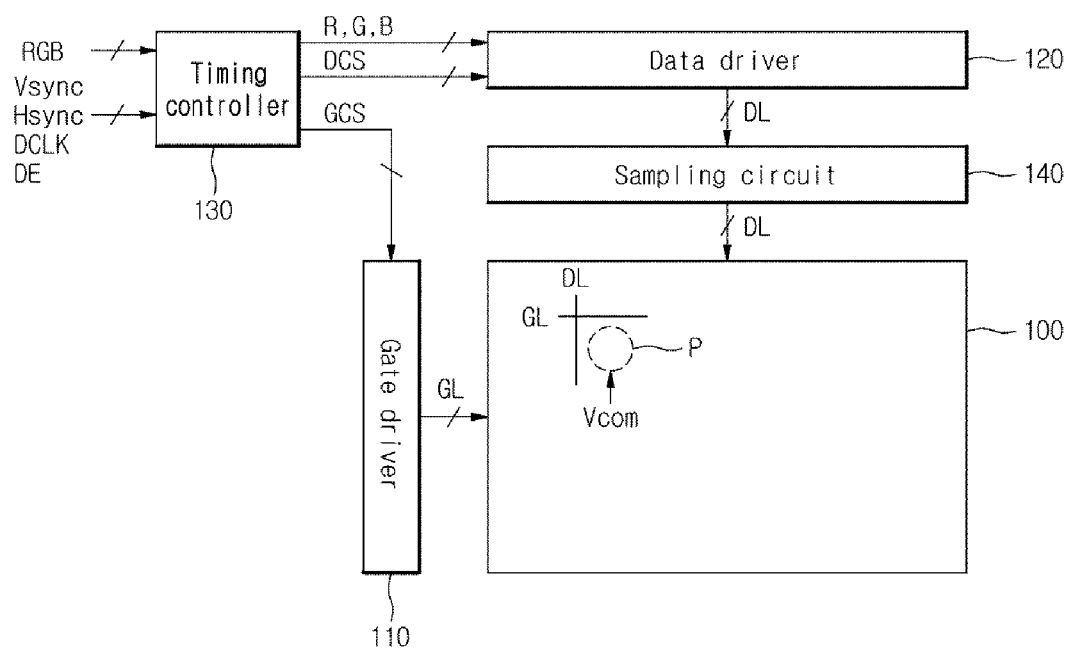
FIG. 1 schematically illustrates a display device according to an exemplary embodiment of the present invention

FIG. 1 schematically illustrates a display device according to an exemplary embodiment of the present invention. The fingerprint detection can be applied to a liquid crystal display (LCD) or an organic light emitting diode (OLED). Hereinafter, an LCD will be mainly described as an example, but this is not intended to limit the application of fingerprint detection to the LCD.

Referring to FIG. 1, an LCD includes a liquid crystal panel 100 having a plurality of pixel regions P that are defined by intersections of a plurality of gate lines GL and a plurality of data lines DL, a gate driver 110 configured for providing a gate signal to the gate lines GL, a data driver 120 configured for providing a data signal to the data lines DL, a timing controller 130 configured for providing a gate driver control signal GCS for controlling the gate driver 110 and a data driver control signal DCS for controlling the data driver 120, and a sampling circuit 140 configured for sampling charged voltages through the data lines DL when a fingerprint is detected.

The liquid crystal panel 100 includes a lower substrate and an upper substrate bonded to face each other for displaying an image. A liquid crystal layer is interposed between the lower substrate and the upper substrate.

The lower substrate includes the plurality of data lines DL and the plurality of gate lines GL that are formed to intersect with each other, and a liquid crystal cell and a fingerprint sensing cell that are formed in at least a portion of the plurality of pixel regions P that are defined by the plurality of gate lines GL intersected with the plurality of data lines DL. The liquid crystal cell includes a thin film transistor (TFT) and a pixel electrode connected to the TFT. The TFT is operated by the gate signal provided through the gate line GL, and supplies the data signal provided through the data line DL to a storage capacitor.

The liquid crystal cell includes a common electrode Vcm facing the pixel electrode with the liquid crystal layer interposed therebetween and the pixel electrode connected to the TFT, and may be equivalently expressed as a liquid crystal capacitor CLc. In addition, the liquid crystal cell includes a storage capacitor Cst configured for allowing the liquid crystal capacitor CLc charged with a pixel voltage corresponding to the data signal in a previous frame to maintain the pixel voltage until the liquid crystal capacitor CLc is charged by the data signal in a current frame.

The upper substrate may include a plurality of color filters and a black matrix. The black matrix may define the pixel region or the liquid crystal cell. In addition, the upper substrate may further include the common electrode. Alternatively, the common electrode may be formed on the lower substrate.

The gate driver 110 applies the gate signal sequentially to the plurality of gate lines GL in response to the gate driver control signal GCS supplied by the timing controller 130. The gate driver 110 may include a shift register, a level shifter configured for adjusting a swing width of output signals from the shift register to be suitable for operating the TFT, and an output buffer connected between the level shifter and the gate line GL.

In response to the data driver control signal DCS from the timing controller 130, the data driver 120 converts RGB signals from the timing controller 130 to analog data signals and applies an analog data signal of one horizontal line to the data lines DL at an interval of one horizontal period in which each data signal is applied to each gate line. Namely, the data driver 120 provides the data signal having a certain level based on gray scale values of signals from the timing controller 130 to the plurality of data lines DL. The data driver 120 may invert the polarity of a data signal in response to a polarity control signal.

The timing controller 130 arranges source data (RGB) provided from an external system to be R, G and B signals suitable for driving the liquid crystal panel 100 and provides the R, G and B signals to the data driver 120. In addition, the timing controller 130 generates the data driver control signal DCS and the gate driver control signal DCS by using a main clock DCLK, a data enable signal DE, horizontal and vertical synchronous signals Hsync, Vsync to the gate driver 110 and the data driver 120, respectively, to control the driving timings thereof.

The sampling circuit 140 is connected between the liquid crystal panel 100 and the data driver 120. The sampling circuit 140 facilitates the data signals from the data driver to be applied to the liquid crystal panel 100 via the data lines, and samples the charged voltage across the storage capacitor via the data lines in between the sequentially applied gate signals. Although FIG. 1 depicts the sampling circuit 140 separated from the data driver 120, this is just an exemplary embodiment so it is also possible to integrate the data driver 120 and the sampling circuit 140. The configuration and operation of the sampling circuit 140 will be described in detail with reference to FIGS. 6 and 7

Figure 2:
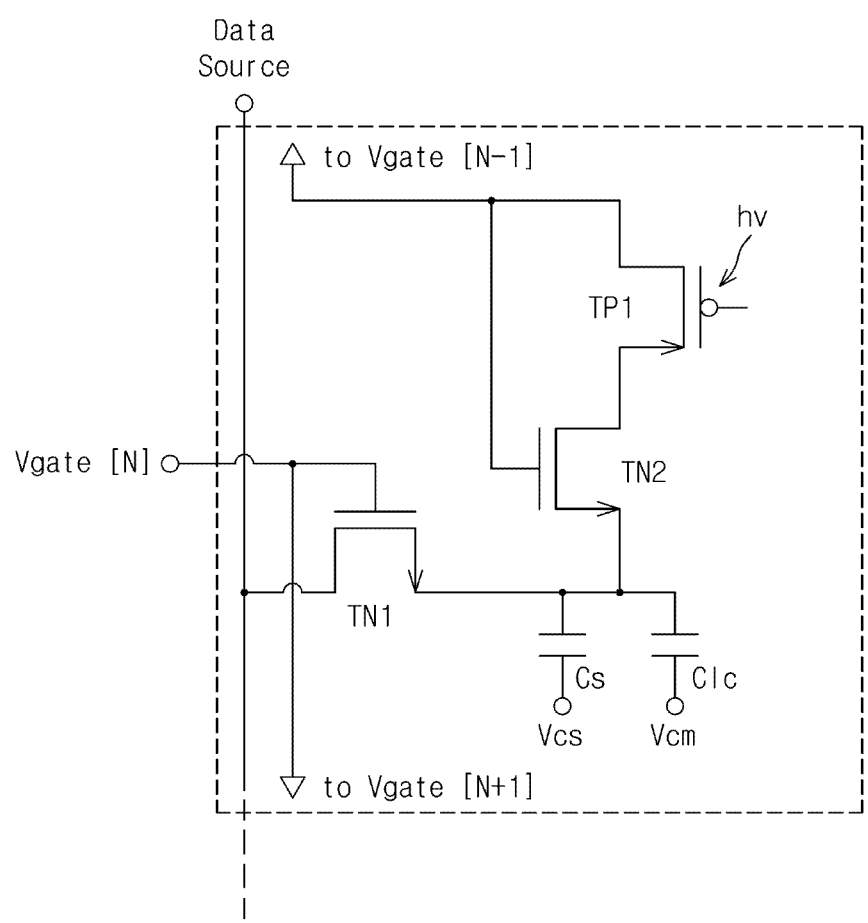
FIG. 2 is an exemplary circuit diagram illustrating a unit pixel implemented in the pixel region P shown in FIG. 1.

FIG. 2 is an exemplary circuit diagram illustrating a unit pixel implemented in the pixel region P shown in FIG. 1.

Referring to FIG. 2, the unit pixel includes a first transistor TN1 and a storage capacitor, which implement the liquid crystal cell, and a second transistor TN2 and a light-receiving element TP1, which implement the fingerprint sensing cell. A source and a drain of the TFT are formed to have a same structure but are distinguished based on their locations. Accordingly, hereinafter, the source and the drain will be collectively referred to as a terminal. In addition, configurations and operations of the LCD and the OLED are commonly well-known in this field of technology so any description irrelevant to the present invention will be omitted.

The first transistor TN1 is a switching transistor configured for applying the data signal to the storage capacitor Cst. A gate of the first transistor TN1 is connected to the $n^{th}$ gate line (n<=N, N being the number of gate lines), and the first terminal is connected to the data line, and the second terminal is connected to one end of the storage capacitor Cst and the pixel electrode. In FIG. 2, the pixel electrode, the common electrode, and the liquid crystal layer interposed therebetween are expressed as the liquid crystal capacitor Clc.

The second transistor TN2 is a switching transistor configured for applying a photo current to the storage capacitor Cst. A gate of the second transistor TN2 is connected to the $(n-1)^{th}$ gate line, and the first terminal is connected to the second terminal of the light-receiving element TP1, and the second terminal is connected to one end of the storage capacitor Cst. The second transistor TN2 allows the liquid crystal cell to operate normally when the light-receiving element TP1 is not operating. In detail, the light-receiving element TP1 should apply the photo current to the storage capacitor Cst only in a period that the gate signal is applied through the $(n-1)^{th}$ gate line, and should not apply the photo current to the storage capacitor Cst during other than that period even if an incident light is detected. Accordingly, the second transistor TN 2 and the light-receiving element TP1 should operate only during the period that the gate signal is applied through the $(n-1)^{th}$ gate line and should not operate during other than that period. In addition, in order to minimize a loss in the aperture ratio, the second transistor TN2 may be formed to be located near the gate line or the data line, or to be overlapped with the gate line or the data line.

The light-receiving element TP1 may be formed with a P-type floating gate transistor. The light-receiving element TP1 performs photo-electric conversion of the incident light hv to apply the photo current to the storage capacitor Cst. Using an electric field that is generated by the floating gate polarized by the incident light, the light-receiving element TP1 may control an amount of photo current flowing through a channel that is formed between the first terminal and the second terminal. The first terminal of the light-receiving element TP1 is connected to the $(n-1)^{th}$ gate line, and the second terminal is connected to the first terminal of the second transistor TN2. The body of the light-receiving element TP1 may be formed to be floated. Since the gate signal that is applied to the first terminal of the light-receiving element TP1 has a voltage relatively higher than the data signal, it is possible to generate a sufficient amount of photo current with a small amount of incident light hv.

The storage capacitor Cst is charged by the data signal in a previous frame and maintains the charged voltage until being charged by the data signal in a current frame. In addition, the charged voltage across the storage capacitor Cst may be changed from the charged voltage corresponding to the data signal in the previous frame by the photo current that the light-receiving element TP1 applies. Here, the time period in which the charged voltage across the storage capacitor Cst connected to the $n^{th}$ gate line is changed by the photo current may be limited to a time period in which a new data signal is applied to the liquid crystal cell connected to the $(n-1)^{th}$ gate line. In order to minimize a change in brightness of a screen and the image appearing on the screen, the charged voltage across the storage capacitor Cst should be changed in the time period relatively shorter than a display time that the liquid crystal cell should maintain the charged voltage corresponding to the data signal in the previous frame. For example, assuming that the number of gate lines in a display device is 480, the charged voltage across the storage capacitor Cst can be changed in $\frac{1}{480}$ per frame. In this case, since the screen is changed instantaneously with data signals on each of the gate lines, a user cannot recognize the change. In addition, one end of the storage capacitor Cst is connected to the second terminal of the first transistor TN1 and the second terminal of the second transistor TN2, and a reference voltage Vcs is applied to the other end of the storage capacitor Cst.

Figure 3:
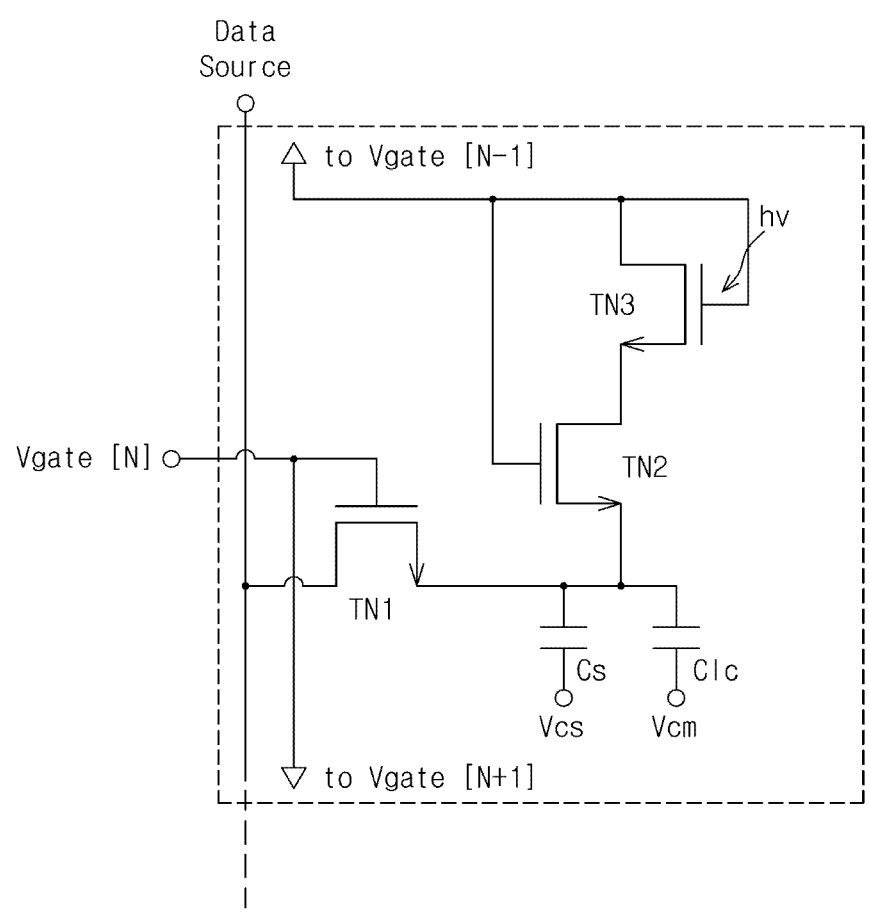
FIG. 3 is another exemplary circuit diagram illustrating a unit pixel implemented in the pixel region P shown in FIG. 1.

FIG. 3 is another exemplary circuit diagram illustrating a unit pixel implemented in the pixel region P shown in FIG. 1. Any description that is already provided with reference to FIG. 2 will be omitted.

Referring to FIG. 3, the light-receiving element TN3 may be implemented with an N-type transistor. The light-receiving element TN3 performs photo-electric conversion of an incident light hv to provide a photo current to the storage capacitor Cst. The light-receiving element TN3 is MOSFET diode connected between the $(n-1)^{th}$ gate line and the first terminal of the second transistor TN2. Like the floating-gate type light-receiving element TP1 shown in FIG. 2, the light-receiving element TN3 has the first terminal that is connected to the $(n-1)^{th}$ gate line and the second terminal that provides the photo current, but the light-receiving element TN3 may have a photosensitivity relatively lower than that of the light-receiving element TP1. However, the light-receiving element TN3 may be implemented by using only an n-type MOSFET, which is used for implementing the liquid crystal cell, so it is advantageous for process simplification and a low fabrication cost.

Figure 4:
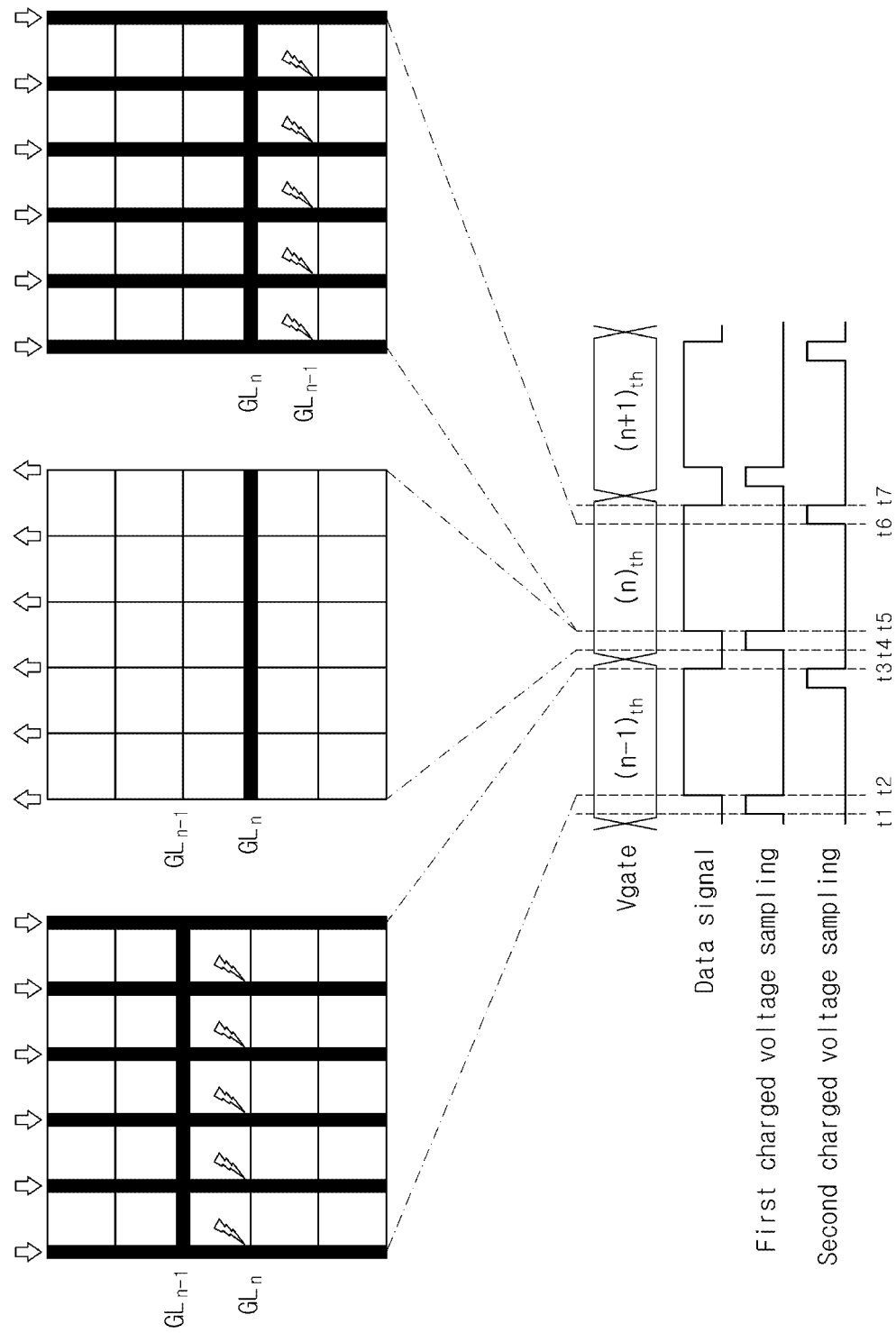
FIG. 4 illustrates an exemplary operation of the display device shown in FIG. 1.

FIG. 4 illustrates an exemplary operation of the display device shown in FIG. 1.

Referring to FIG. 4, the gate signal $V_{gate}$ is applied to the $(n-1)^{th}$ gate line $GL_{n-1}$ of the plurality of gate lines. Accordingly, the liquid crystal cell $LC_{n-1}$ and the fingerprint sensing cell $FD_n$ start operating. The gate of the second transistor $TN2_n$ of the fingerprint sensing cell $FD_n$ and the first terminal of the light-receiving element $TP1_n$ or $TN3_n$, which are located in the pixel region corresponding to the $n^{th}$ gate line $GL_n$, are connected to the $(n-1)^{th}$ gate line $GL_{n-1}$. Accordingly, the liquid crystal cell $LC_n$ does not operate yet, but the fingerprint sensing cell $FD_n$ may operate because the gate signal $V_{gate}$ is provided to the fingerprint sensing cell $FD_n$ through the gate line $GL_{n-1}$.

When the gate signal $V_{gate}$ is applied via the gate line $GL_{n-1}$ during a time period between t1 and t3, the data signal is applied to the liquid crystal cell $LC_{n-1}$ via the data line. Also, the fingerprint sensing cell $FD_n$ operates to detect the incident light during the time period between t1 and t3. The photo current that the light-receiving element $TP1_n$ or $TN3_n$ generates by performing the photo-electric conversion is applied to the $n^{th}$ storage capacitor $Cst_n$ in the liquid crystal cell $LC_n$. Although the fingerprint sensing cell $FD_n$ is operated by the gate signal $V_{gate}$ on the $(n-1)^{th}$ gate line $GL_{n-1}$, the fingerprint sensing cell $FD_n$ detects the incident light that enters the pixel region in which the liquid crystal cell $LC_n$ is located. In addition, the charged voltage across the storage capacitor $Cst_{n-1}$ that is located in the pixel region corresponding to the $(n-1)^{th}$ gate line $GL_{n-1}$ is sampled during a time period between t1 and t2.

When the gate signal $V_{gate}$ is applied via the gate line $GL_n$ during a time period between t4 and t7, the first charged voltage across the storage capacitor $Cst_n$ that is located in the pixel region corresponding to the $n^{th}$ gate line $GL_n$ is sampled during a time period between t4 and t5. The first charged voltage is a sum of pixel voltages corresponding to the data signal applied in the previous frame and a photo voltage corresponding to the photo current applied by the fingerprint sensing cell $FD_n$ during the time period between t1 and t3. The first charged voltage is sampled before the data signal is applied to the liquid crystal cell $LC_n$ that is connected to the gate line $GL_n$. In order to sample the first charged voltage before the data signal is applied to the liquid crystal cell $LC_n$, there should be an interval between t4 and t5, whereas t4 is a start time of the gate signal and t5 is a start time of the data signal. In addition, when the gate signal $V_{gate}$ is applied via the gate line $GL_n$ during the time period between t4 and t7, the fingerprint sensing cell $FD_{n+1}$ located in the pixel region corresponding to the $(n+1)^{th}$ gate line $GL_{n+1}$ operates.

When the data signal is applied to the liquid crystal cell $LC_n$ that is connected to the gate line $GL_n$ via the data line during a time period between t5 and t7, the second charged voltage across the storage capacitor $Cst_n$ that is located in the pixel region corresponding to the gate line $GL_n$ is sampled during a time period between t6 and t7. The second charged voltage is a pixel voltage corresponding to the data signal that is applied in the current frame.

As described above, one gate signal $V_{gate}$ allows the liquid crystal cell LC and the fingerprint sensing cell FD to simultaneously operate, both connected to the same gate line GL. In addition, since the gate signal $V_{gate}$ is applied sequentially via the plurality of gate lines GL, the fingerprint sensing cells also operate sequentially. Instead of operating all fingerprint sensing cells FD at the same time, fingerprint sensing cells FD operate sequentially, namely, gate line by gate line, so a time required for acquiring a fingerprint image increases, but an additional power consumption by the fingerprint sensing cells FD can be kept relatively small. In addition, unlike touch recognition, fingerprint recognition does not need to be done instantaneously. Since the conventional display device is required to output several tens of frames per second, there will be no or less difference in the time required for any application to authenticate a user even though the fingerprint sensing cells operate sequentially.

Figure 5:
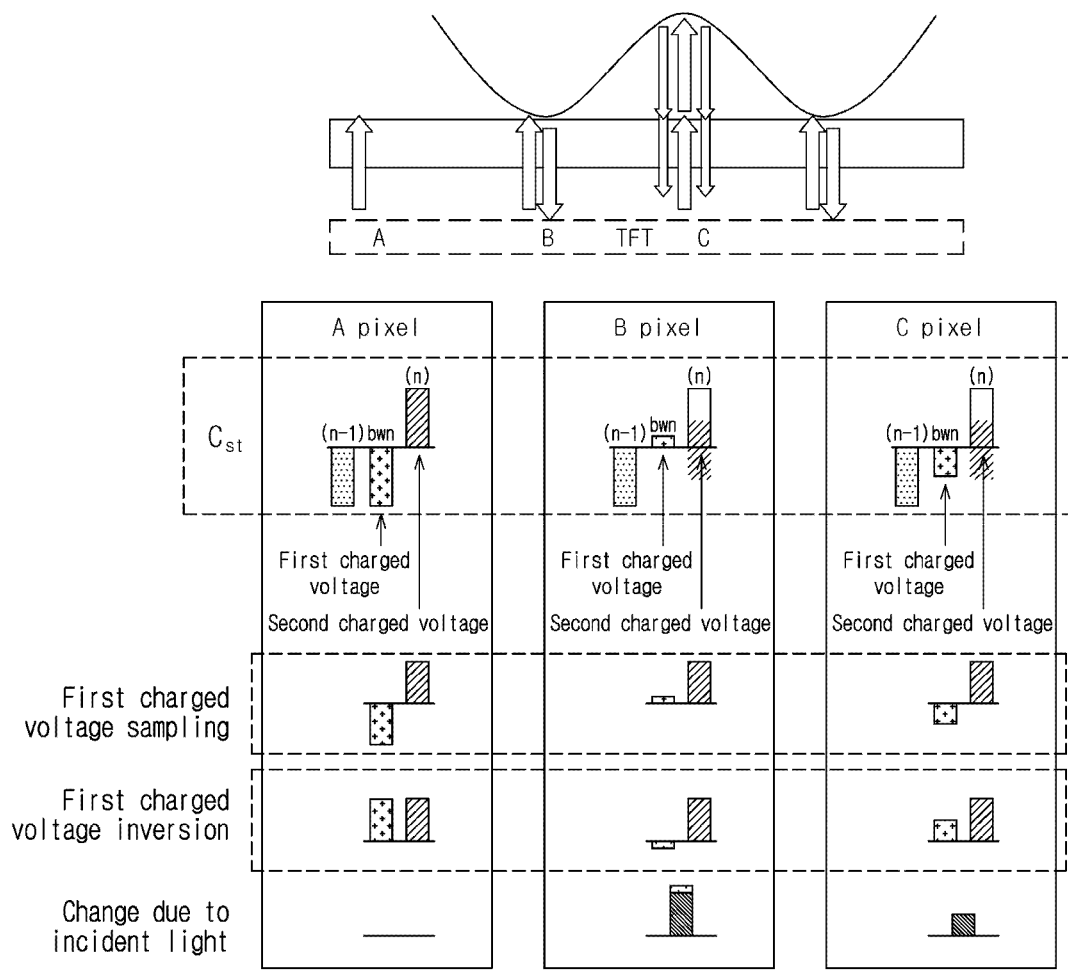
FIG. 5 illustrates the principle of operation according to the present invention.

FIG. 5 illustrates the principle of operation according to the present invention.

The conventional LCD adopts an inversion mechanism that applies data signals having two different polarities to each unit of liquid crystal cells in order to prevent a flicker. The polarity of a data signal may be inverted, for example, in each liquid crystal cell, in each gate line, or even in each frame. Hereinafter, it will be assumed that a data signal having a negative polarity is applied to the unit pixel in the previous frame. Although FIG. 5 illustrates that the polarity of the charged voltage is inverted due to the photo current when a ridge of a fingerprint is placed over the unit pixel, it should be understood that the polarity of the charged voltage may not be inverted due to many factors such as, for example, a capacitance of the storage capacitor and a type or efficiency of the light-receiving element.

Referring to FIG. 5, unit pixel A, on which no ridge or valley of a fingerprint is located, unit pixel B, on which the ridge is located, and unit pixel C, on which the valley is located, are depicted. Since there is no ridge or valley located on unit pixel A, light from unit pixel A penetrates a cover glass so no light enters into unit pixel A. On the contrary, since the ridge is located on the unit pixel B, light being reflected on the ridge or emitted from the ridge enters unit pixel B. Similarly, since the valley is located on unit pixel C, light being reflected on the valley or emitted from the valley enters unit pixel C. An intensity of light or an amount of light entering unit pixel B is relatively greater than that entering unit pixel C.

In unit pixel B or unit pixel C, each fingerprint sensing cell generates a photo current in substantially proportional to the intensity or amount of incident light. Once the generated photo current is applied to the storage capacitor, the charged voltage across the storage capacitor is changed. In detail, the charged voltage across the storage capacitor is maintained at the negative pixel voltage corresponding to the data signal in the previous frame, and then changed due to the photo current that the fingerprint sensing cell provides. In unit pixel B, the photo current that is proportional to the light from the ridge is applied to the storage capacitor. Due to the photo current that is substantially proportional to the intensity or amount of light, the charged voltage across the storage capacitor is changed from negative to positive. Meanwhile, in unit pixel C, since the photo current corresponding to the light from the valley is relatively smaller than the photo current in unit pixel B, the charged voltage across the storage capacitor is changed, but the polarity is not changed.

In order to measure the amount of change caused by the incident light, the charged voltage across the storage capacitor is sampled twice to the first charged voltage and the second charged voltage. The sampled first charged voltage represents that the pixel voltage corresponding to the data signal in the previous frame is changed by the photo current, and the sampled second charged voltage represents the pixel voltage corresponding to the data signal in the current frame. Since the second charged voltage is the pixel voltage corresponding to the data signal, it may be possible to obtain the second charged voltage by sampling the data signal outputted from the data driver. Since the polarity of the sampled first charged voltage and the sampled second charged voltage are different from each other, the polarity of the sampled first charged voltage is inverted to measure the difference from the sampled second charged voltage. The first charged voltage and the second charged voltage are generated, respectively, by the data signals that are applied in different frames so it is preferable that there is little or no change between the previous frame and the current frame.

In unit pixel A, as there is no photo current generated by the incident light, the first charged voltage and the second charged voltage are substantially identical. In detail, the polarities of the first charged voltage and the second charged voltage are different, but the absolute values of the first charged voltage and the second charged voltage are the same. Accordingly, the result of subtracting the inverted first charged voltage from the second charged voltage will be substantially zero. This means that the ridge or the valley is not located on unit pixel A.

In unit pixel B, the polarity of the first charged voltage is inverted due to the relatively large photo current that is generated by the incident light. Accordingly, the result of subtracting the inverted first charged voltage from the second charged voltage will be greater than the second charged voltage.

In unit pixel C, although the first charged voltage is changed by the relatively small photo current, the polarity is not changed. Accordingly, the result of subtracting the inverted first charged voltage from the second charged voltage will be smaller than the second charged voltage.

Although an example is described above that the charged voltage across the storage capacitor is changed from negative to positive, it shall be easily understood that the same principle is also applicable when the charged voltage across the storage capacitor is changed from positive to negative. Since a constant power source provides a current, the change caused by the photo current in the negative charged voltage may be relatively greater than that in the positive charged voltage. Nevertheless, there may be no or little margin for the change caused by the photo current in the positive charged voltage. For example, if the storage capacitor is charged in positive by the brightest white light, the charged voltage across the storage capacitor will not be increased by the photo current.

Figure 6:
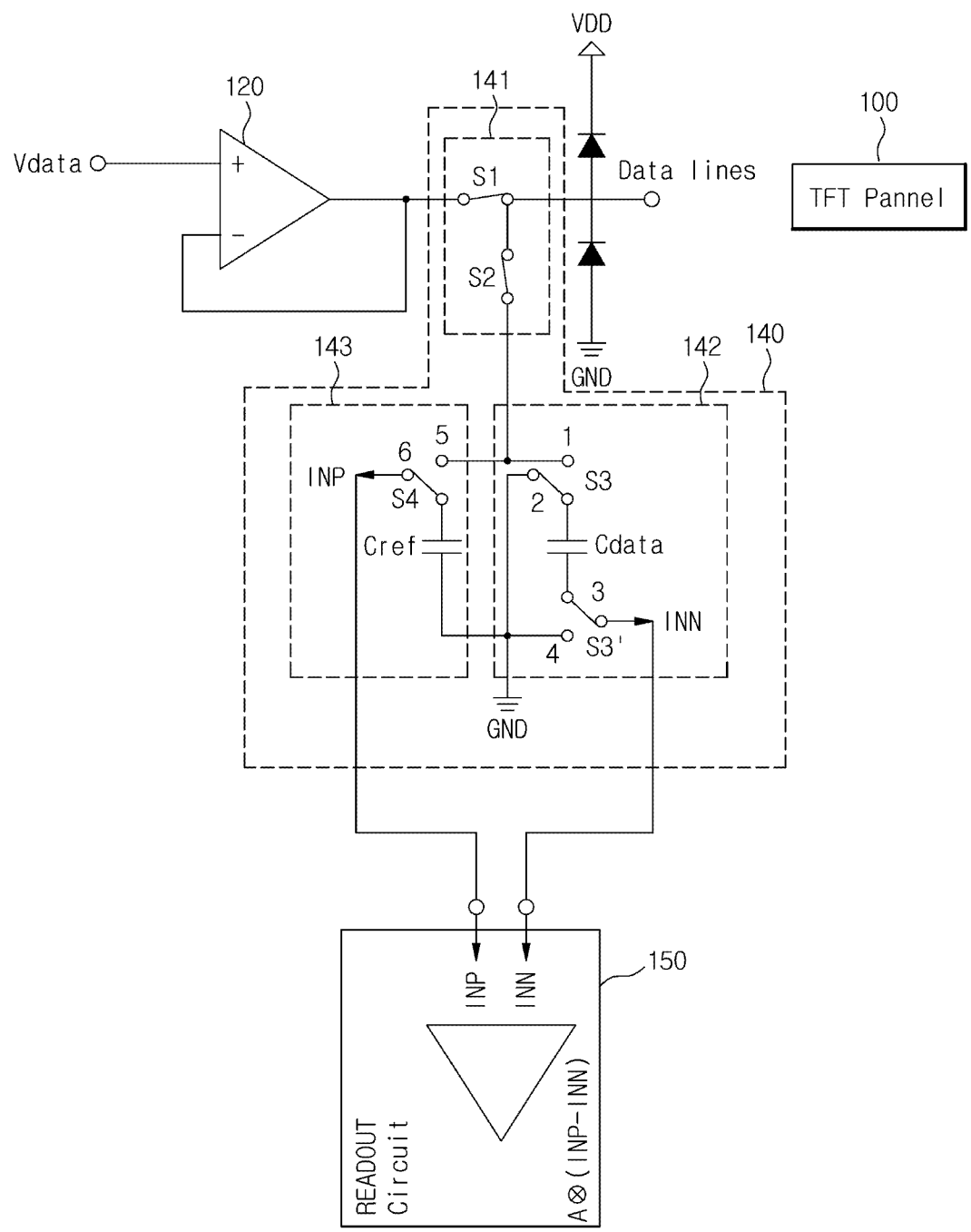
FIG. 6 is an exemplary circuit diagram illustrating the structure of a sampling circuit.

FIG. 6 is an exemplary circuit diagram illustrating the structure of a sampling circuit, which implements the principle of operation described with reference to FIG. 5.

Referring to FIG. 6, the sampling circuit 140 includes a sampling setting switch 141, a first charged voltage sampling circuit 142, and a second charged voltage sampling circuit 143.

The sampling setting switch 141 includes two switches S1 and S2, and is located between the data driver 120 and the liquid crystal panel 100. The sampling setting switch 141 is configured for turning on and off the switches S1 and S2 to establish a route for applying the data signal from the data driver 120 to the liquid crystal panel 100 or a route for reading the first and second charged voltages from the unit pixel in the liquid crystal panel 100. In detail, one end of the switch S1 is connected to an output terminal of the data driver 120, and the other end of the switch S1 is connected to the liquid crystal panel 100. One end of the switch S2 is connected to the other end of the switch S1, and the other end of the switch S2 is connected to input terminals of the first charged voltage sampling circuit 142 and the second charged voltage sampling circuit 143.

The first charged voltage sampling circuit 142 includes two switches S3 and S3' and a first capacitor Cdata, and is located between the other end of the switch S2 and a ground node GND. The first charged voltage sampling circuit 142 samples the first charged voltage across the storage capacitor in the unit pixel, and inverts the polarity of the first charged voltage. In detail, the switch S3 is switching between nodes 1 and 2, and the switch S3' is switching between nodes 3 and 4. When the first charged voltage is sampled, the switch S3 is connected to the node 1, and the switch S3' is connected to the node 4. As a result, one end of the first capacitor Cdata is connected to the data line so that the first capacitor Cdata may be charged by the first charged voltage across the storage capacitor. When the sampled first charged voltage is outputted, the switch S3 is connected to the node 2, and the switch S3' is connected to the node 3. As a result, the polarity of the first charged voltage across the first capacitor Cdata is inverted. The inverted first charged voltage is applied to a negative input terminal INN of a readout circuit 150 via the node 3.

The second charged voltage sampling circuit 143 includes a switch S4 and a second capacitor Cref, and is located between the other end of the switch S2 and the ground node GND. The second charged voltage sampling circuit 143 samples the second charged voltage across the storage capacitor in the unit pixel. In detail, the switch S4 is switching between nodes 5 and 6. When the second charged voltage is sampled, the switch S4 is connected to the node 5. As a result, one end of the second capacitor Cref is connected to the data line so that the second capacitor may be charged by the second charged voltage. Alternatively, one end of the second capacitor Cref may be connected to the output terminal of the data driver 120 so that the second charged voltage may be the pixel voltage corresponding to the data signal outputted from the data driver 120. The second charged voltage is applied to a positive input terminal INP of the readout circuit 150 via a node 6.

The readout circuit 150 is connected to output terminals of the sampling circuit 140, and outputs the change of incident light by using the sampled first and second charged voltages.

Figure 7:
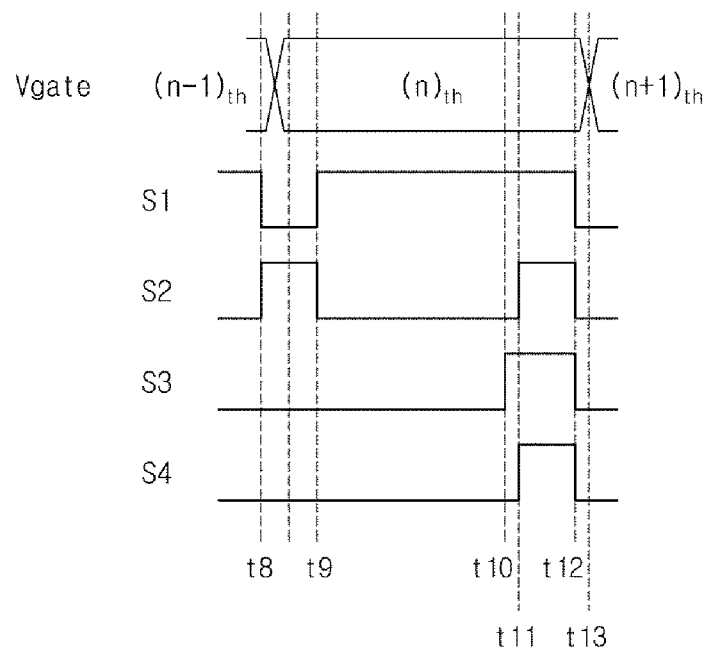
FIG. 7 illustrates the exemplary operation of the sampling circuit shown in FIG. 6.

FIG. 7 illustrates the exemplary operation of the sampling circuit shown in FIG. 6.

Referring to FIG. 7, the gate signal $V_{gate}$ is applied to the nth gate line $GL_n$ of the plurality of gate lines. During a time period between t8 and t9, the switch S1 is open to release a connection between the data driver 120 and the data lines, and the switch S2 is closed to establish a connection between the sampling circuit 140 and the data lines. The time period between t8 and t9 may be substantially identical to the time period between t3 and t5 shown in FIG. 3. In addition, during the time period between t8 and t9, the switch S3 is connected to the node 1, the switch S3' is connected to the node 4, and the switch S4 is connected to the node 6. Accordingly, the first capacitor Cdata is connected between the data line and the ground node GND so that the first capacitor Cdata is charged by the first charged voltage across the storage capacitor.

During a time period between t9 and t13, the switch S1 is closed to establish the connection between the data driver 120 and the data lines.

During a time period between t9 and t11, the switch S2 is open to release the connection between the sampling circuit 140 and the data lines.

During a time period between t10 and t13, the switch S3 is connected to the node 2 and the switch S3' is connected to the node 3. Since the node 2 is connected to the ground node and the node 3 is the output terminal of the first charged voltage sampling circuit 142, the first charged voltage across the first capacitor Cdata is inverted.

During a time period between t11 and t13, the switch S2 is closed, and during a time period between t11 and t12, the switch S4 is connected to the node 5. As a result, the second charged voltage sampling circuit 143 is charged by the data signal outputted from the data driver. Here, the voltage across the second capacitor Cref charged by the data signal is substantially identical to the second charged voltage.

The switch S4 is connected again to the node 6 at t12. Accordingly, the first and second charged voltages that are sampled during a time period between t12 and t13 are outputted from the sampling circuit 140.

The above description is provided for illustrative purposes only, and it shall be appreciated by anyone having ordinary skill in the art to which the present invention pertains that permutations to other specific forms are possible without modifying the technical ideas or essential features. Therefore, the embodiments described above shall be understood to be illustrative, not restrictive, in every aspect.

The scope of the present invention shall be apparent through the claims appended below, rather than through the above description, and it shall be interpreted that every permutation or modified form contrived from the meaning and scope, and their equivalents, of the claims is included in the claims of the present invention.

What is claimed is:

1. A display device for fingerprint detection, comprising:
a plurality of gate lines configured to apply gate signals;
a plurality of data lines intersecting with the plurality of gate lines to define a plurality of pixel regions and configured to apply data signals;
a first switching transistor located in the pixel region and configured to output the data signal that is applied to a first terminal to a second terminal when the gate signal is applied to a gate that is connected to an n$^{th}$ gate line of the plurality of gate lines;

a storage capacitor, located in the pixel region, having one end thereof connected to the second terminal of the first switching transistor, and configured to store a charge in response to the data signal;

a light-receiving element located in the pixel region and having a first terminal thereof connected to an (n−1)$^{th}$ gate line of the plurality of gate lines;

a second switching transistor, including a gate thereof connected to the (n−1)$^{th}$ gate line, including a first terminal thereof connected to a second terminal of the light-receiving element, and including a second terminal thereof connected to the one end of the storage capacitor, wherein the plurality of data lines are used for reading a charged voltage across the storage capacitor;

at least one data driver configured to provide the data signal to the plurality of data lines; and a sampling circuit connected to the plurality of data lines and configured to sample the charged voltage across the storage capacitor, wherein the plurality of data lines are used for reading a charged voltage across the storage capacitor, wherein the sampling circuit comprises:

a first charged voltage sampling circuit configured to sample the charged voltage across the storage capacitor through the plurality of data lines;

a second charged voltage sampling circuit configured to sample a voltage in response to the data signal; and a sampling setting switch located between the data driver and the plurality of data lines and configured to connect the plurality of data lines to the data driver or the first charged voltage sampling circuit and the second charged voltage sampling circuit, wherein the first charged voltage sampling circuit comprises:

a first capacitor configured to maintain a first charged voltage; and a first switch and a second switch, connected, respectively, to either end of the first capacitor, wherein the first switch is switched between the plurality of data lines and a ground, wherein the second switch is switched between a negative input terminal of a readout circuit and the ground, and wherein the first charged voltage sampling circuit is configured to invert a polarity of the first charged voltage by the first switch and the second switch.

2. The display device according to claim 1, wherein the light-receiving element is a diode-coupled transistor connected between the (n−1)$^{th}$ gate line and the second terminal of the second switching transistor.

3. The display device according to claim 1, wherein the light-receiving element is a floating gate transistor.

4. The display device according to claim 1, wherein the second switching transistors are connected, respectively, to the plurality of gate lines, and wherein the light-receiving elements operate sequentially by the gate signals that are provided by the plurality of gate lines.

5. A display device for fingerprint detection, comprising:
a plurality of gate lines configured to apply gate signals;
a plurality of data lines intersecting with the plurality of gate lines to define a plurality of pixel regions and configured to apply data signals;
a first switching transistor located in the pixel region and configured to output the data signal that is applied to a first terminal to a second terminal when the gate signal is applied to a gate that is connected to an n$^{th}$ gate line of the plurality of gate lines;

a storage capacitor, located in the pixel region, having one end thereof connected to the second terminal of the first switching transistor, and configured to store a charge in response to the data signal;

a light-receiving element located in the pixel region and having a first terminal thereof connected to an (n−1)$^{th}$ gate line of the plurality of gate lines;

a second switching transistor, including a gate thereof connected to the (n−1)$^{th}$ gate line, including a first terminal thereof connected to a second terminal of the light-receiving element, and including a second terminal thereof connected to the one end of the storage capacitor, wherein the plurality of data lines are used for reading a charged voltage across the storage capacitor;

at least one data driver configured to provide the data signal to the plurality of data lines; and a sampling circuit connected to the plurality of data lines and configured to sample the charged voltage across the storage capacitor, wherein the plurality of data lines are used for reading a charged voltage across the storage capacitor, wherein the sampling circuit comprises:

a first charged voltage sampling circuit configured to sample the charged voltage across the storage capacitor through the plurality of data lines;

a second charged voltage sampling circuit configured to sample a voltage in response to the data signal; and a sampling setting switch located between the data driver and the plurality of data lines and configured to connect the plurality of data lines to the data driver or the first charged voltage sampling circuit and the second charged voltage sampling circuit, wherein the second charged voltage sampling circuit comprises:

a second capacitor configured to maintain a voltage corresponding to the data signal; and a third switch connected to one end of the second capacitor, wherein the third switch is switched between an output terminal of the data driver and a positive input terminal of the readout circuit.

6. A display device for fingerprint detection, comprising:
a plurality of gate lines configured to apply gate signals;
a plurality of data lines intersecting with the plurality of gate lines to define a plurality of pixel regions and configured to apply data signals;
a first switching transistor located in the pixel region and configured to output the data signal that is applied to a first terminal to a second terminal when the gate signal is applied to a gate that is connected to an n$^{th}$ gate line of the plurality of gate lines;

a storage capacitor, located in the pixel region, having one end thereof connected to the second terminal of the first switching transistor, and configured to store a charge in response to the data signal;

a light-receiving element located in the pixel region and having a first terminal thereof connected to an (n−1)$^{th}$ gate line of the plurality of gate lines;

a second switching transistor, including a gate thereof connected to the (n−1)$^{th}$ gate line, including a first terminal thereof connected to a second terminal of the light-receiving element, and including a second terminal thereof connected to the one end of the storage capacitor, wherein the plurality of data lines are used for reading a charged voltage across the storage capacitor;

at least one data driver configured to provide the data signal to the plurality of data lines; and a sampling circuit connected to the plurality of data lines and configured to sample the charged voltage across the storage capacitor, wherein the plurality of data lines are used for reading a charged voltage across the storage capacitor, wherein the sampling circuit comprises:

a first charged voltage sampling circuit configured to sample the charged voltage across the storage capacitor through the plurality of data lines;

a second charged voltage sampling circuit configured to sample a voltage in response to the data signal; and a sampling setting switch located between the data driver and the plurality of data lines and configured to connect the plurality of data lines to the data driver or the first charged voltage sampling circuit and the second charged voltage sampling circuit, wherein the first charged voltage sampling circuit is configured to sample the charged voltage across the storage capacitor, wherein the charged voltage across the storage capacitor is changed from a voltage that is set by the data signal in a previous frame by a current that the light-receiving element generates, and wherein the storage capacitor is configured to maintain the charged voltage until a new data signal is applied in the current frame.

7. The display device according to claim 6, wherein a polarity of the data signal in the previous frame and a polarity of the data signal in the current frame are different from each other.

* * * * *